Sept. 29, 1925.
G. H. MATTHEWS
1,555,140
REMOVABLE CUTTER HEAD FOR MOTOR DRIVEN MOLDERS
Filed March 27, 1922
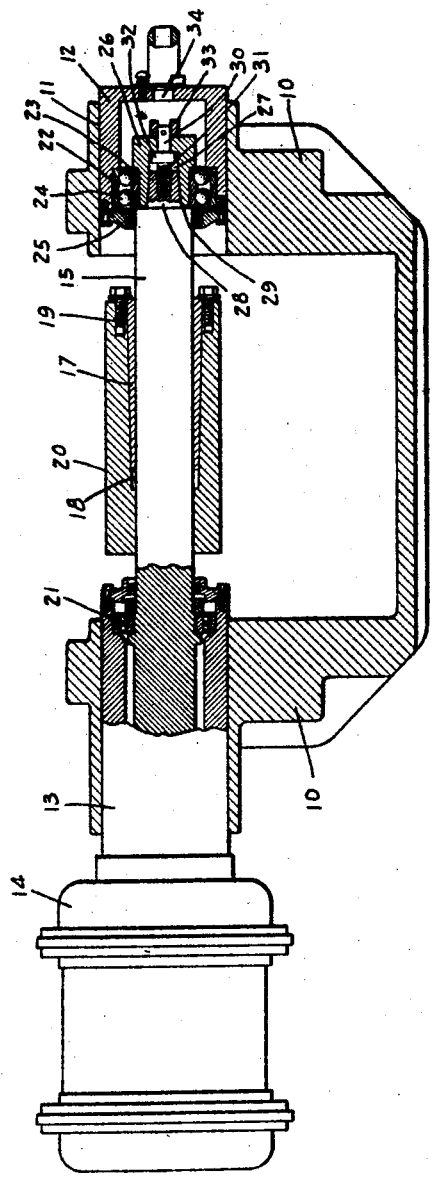
INVENTOR.
GLENN H. MATTHEWS,
BY
ATTORNEYS.

Patented Sept. 29, 1925.

1,555,140

UNITED STATES PATENT OFFICE.

GLENN H. MATTHEWS, OF INDIANAPOLIS, INDIANA, ASSIGNOR TO ANTON VONNEGUT, OF INDIANAPOLIS, INDIANA.

REMOVABLE CUTTER HEAD FOR MOTOR-DRIVEN MOLDERS.

Application filed March 27, 1922. Serial No. 546,989.

*To all whom it may concern:*

Be it known that I, GLENN H. MATTHEWS, a citizen of the United States, and a resident of Indianapolis, county of Marion, and State of Indiana, have invented a certain new and useful Removable Cutter Head for Motor-Driven Molders; and I do hereby declare that the following is a full, clear, and exact description thereof, reference being had to the accompanying drawings, in which like numerals refer to like parts.

This invention relates to a new and useful improvement in bearing constructions, and more particularly to the bearing construction for supporting the cutter head and shaft in the carriage of the machine, whereby the cutter head may be readily set therein or removed without removing or tearing down any of the bearing structure.

The particular feature of the invention consists in the construction of the bearings for supporting the shaft on a support, whereby the entire ball bearing structure may be readily removed from the shaft and support without disturbing any of the parts.

For more fully understanding the invention and the use thereof, reference may be had to the patent issued to Monte B. Gathman, February 14, 1922, No. 1,406,843, and my co-pending application, Serial No. 544,524, filed March 17, 1922.

The full nature of the invention will be understood from the accompanying drawings and the following description and claims.

In the drawings, the figure is a central vertical section through the cutter head carriage, showing a portion of the shaft and driving motor in elevation.

In the drawing there is shown carriage 10 having an opening 11 therein for receiving the bearing housing 12 and an extension bearing housing 13 upon which is supported a motor housing 14 for driving the cutter head shaft 15. The cutter head 20 is removably mounted on the shaft 15 and is slidably removable therefrom for the purpose of renewing the cutter head or exchanging it for a smaller or larger size.

The shaft 15 is rotatably supported in the ball bearing construction 21 mounted in the extension bearing 13, so that said cutter head and shaft may be rotated therein by the electric motor contained in the housing 14.

The bearing housing 12 contains therein the ball bearing race 22 and the inner race 23 between which the ball bearings 24 ride. The ball races 22 and 23 are rigidly secured within the housing by the head 25. The inner ball race 23 supports and is secured about the shaft receiving member 26, so that said member is free to rotate within the bearings. The member 26 is provided with a tapered recess 27 into which the tapered end 28 of the shaft 15 is adapted to extend, the tapered end 28 being reduced so as to provide a shoulder portion 29 adapted to abut against the inner race 23 and said member, and rotate therewith. By means of this arrangement, the end of the cutter head shaft is rotatably supported in a ball bearing construction which is removable therefrom, as will be hereinafter explained. Extending centrally through the closed end of the member 26, there is a rotatable bolt 30 having a screw-threaded end 31 adapted to screw in the end 28 of said shaft, said bolt having a radial flange or shoulder portion 32 adapted to abut against the inner side of said member, and a recessed ring 33 secured on the outer end thereof adapted to abut against the outer end of said member 26, whereby said bolt will be free to rotate within the end of said member, but will not move longitudinally therethrough. In the end of the housing 12 opposite said bolt, there is provided an opening 34 through which a tool may be extended for engaging in the recessed ring 33 for turning said bolt so as to cause it to screw in and out of the shaft 15. When it is screwed into said shaft, it will draw the tapered end thereof into the tapered recess 27 of the member 26 for rigidly securing the shaft in said bearing, and upon screwing the bolt out of the end of said shaft, it will force it from the recess 27 and out of engagement with the member 26, so that the entire bearing and housing 12 may be readily removed therefrom.

Upon separating the shaft from the bearing rather than the shaft moving therefrom, the bearing is moved from the shaft, sliding outwardly through the opening 11 of the carriage 10. This permits the entire bearing construction, including the housing, to be removed from the carriage, leaving the end of the shaft 15 free for permitting the cutter head 20 to be drawn therefrom over the end thereof and through the opening 11. This arrangement permits the dismounting of the cutter head as readily when the ball bearing mounting is used as when a plain bearing mounting is used.

The invention claimed is:

1. A ball bearing structure including a ball bearing, a support therefor, a shaft having an end engaged in said bearing, a receiving member mounted in said bearing provided with a central recess for receiving the end of said shaft, and a threaded member rotatably mounted in said receiving member adapted to be screwed into said shaft for drawing said member and shaft into locking engagement when turned in one direction, and screwed out of said shaft for forcing said member out of locking engagement with said shaft and release the same when turned in the opposite direction.

2. A ball bearing, a support therefor, a shaft having an end engaged in said bearing, said shaft having a tapered end, a receiving member mounted in said bearing provided with a central recess for receiving the tapered end of said shaft, and a threaded member rotatably mounted in said receiving member adapted to be screwed into said shaft for drawing said member into wedging engagement with said shaft and securing it thereon when turned in one direction, and screwed out of said shaft for forcing said member out of wedging engagement and releasing it from said shaft when turned in the opposite direction.

3. A ball bearing, a support therefor, a shaft having an end engaged in said bearing, said shaft having a tapered end, a receiving member mounted in said bearing provided with a central recess for receiving the tapered end of said shaft, a threaded bolt rotatably mounted in said receiving member adapted to be screwed into said shaft for drawing said member into wedging engagement with said shaft when turned in one direction, and screwed out of said member for forcing it out of wedging engagement and releasing it from said shaft when turned in the opposite direction, and a housing enclosing said bearing having an opening for permitting access to said bolt, said housing being removably mounted in said carriage.

In witness whereof I have hereunto affixed my signature.

GLENN H. MATTHEWS.